(12) United States Patent
Basiewicz et al.

(10) Patent No.: US 10,197,108 B2
(45) Date of Patent: Feb. 5, 2019

(54) SPRING ELEMENT FOR A FRICTION DEVICE

(71) Applicant: Miba Frictec GmbH, Laarkirchen (AT)

(72) Inventors: Michael Basiewicz, Gondelsheim (DE); Michael Aschoff, Buehl (DE); Philipp Merkel, Waiblingen (DE); Markus Muehlegger, Pinsdorf (AT)

(73) Assignee: Miba Frictec GmbH, Laakirchen (AT)

( * ) Notice: Subject to any disclaimer, the term of this patent is extended or adjusted under 35 U.S.C. 154(b) by 258 days.

(21) Appl. No.: 15/300,892

(22) PCT Filed: Mar. 31, 2015

(86) PCT No.: PCT/AT2015/050083
§ 371 (c)(1),
(2) Date: Sep. 30, 2016

(87) PCT Pub. No.: WO2015/149100
PCT Pub. Date: Oct. 8, 2015

(65) Prior Publication Data
US 2017/0023071 A1    Jan. 26, 2017

(30) Foreign Application Priority Data
Apr. 1, 2014 (AT) .............................. A 50241/2014

(51) Int. Cl.
*F16D 13/64* (2006.01)
(52) U.S. Cl.
CPC ........ *F16D 13/64* (2013.01); *F16D 2013/642* (2013.01)
(58) Field of Classification Search
CPC .......................... F16D 13/64; F16D 2013/642
See application file for complete search history.

(56) References Cited

U.S. PATENT DOCUMENTS

| 1,810,360 A | 6/1931 | Loeffler |
| 1,934,109 A | 11/1933 | Wemp |
| (Continued) | | |

FOREIGN PATENT DOCUMENTS

| CN | 1074871 A | 8/1993 |
| CN | 1120133 A | 4/1996 |
| (Continued) | | |

OTHER PUBLICATIONS

International Search Report of PCT/AT2015/050083, dated Nov. 2, 2015.

*Primary Examiner* — Stacey A Fluhart
(74) *Attorney, Agent, or Firm* — Collard & Roe, P.C.

(57) ABSTRACT

The invention relates to a spring element (4) for a friction device comprising a spring element body (10) having a first spring element body part (11) and a second spring element body part (12) arranged behind it in the axial direction, which rest on each other in some areas, and each spring element body part (11, 12) has receiving areas (15) arranged beside one another in a circumferential direction (13) for friction linings (2, 3) that can be fixed to both sides, and the first spring element body part (11) and the second spring element body part (12) are formed in a ring shape and a first and second receiving tab (19, 20) are formed for each receiving area (15) for the friction linings (2, 3), and the first receiving tab (19) is arranged underneath the second receiving tab (20) in the radial direction, and the first receiving tab (19) and the second receiving tab (20) of each receiving area (15) for the friction linings (2, 3) of the first spring element body part (11) are formed by the latter and the first receiving tab (19) and the second receiving tab (20) of each receiving area (15) for the friction linings (2, 3) of the second spring element body part (12) are formed by the latter.

10 Claims, 4 Drawing Sheets

(56) References Cited

U.S. PATENT DOCUMENTS

Figure 1:
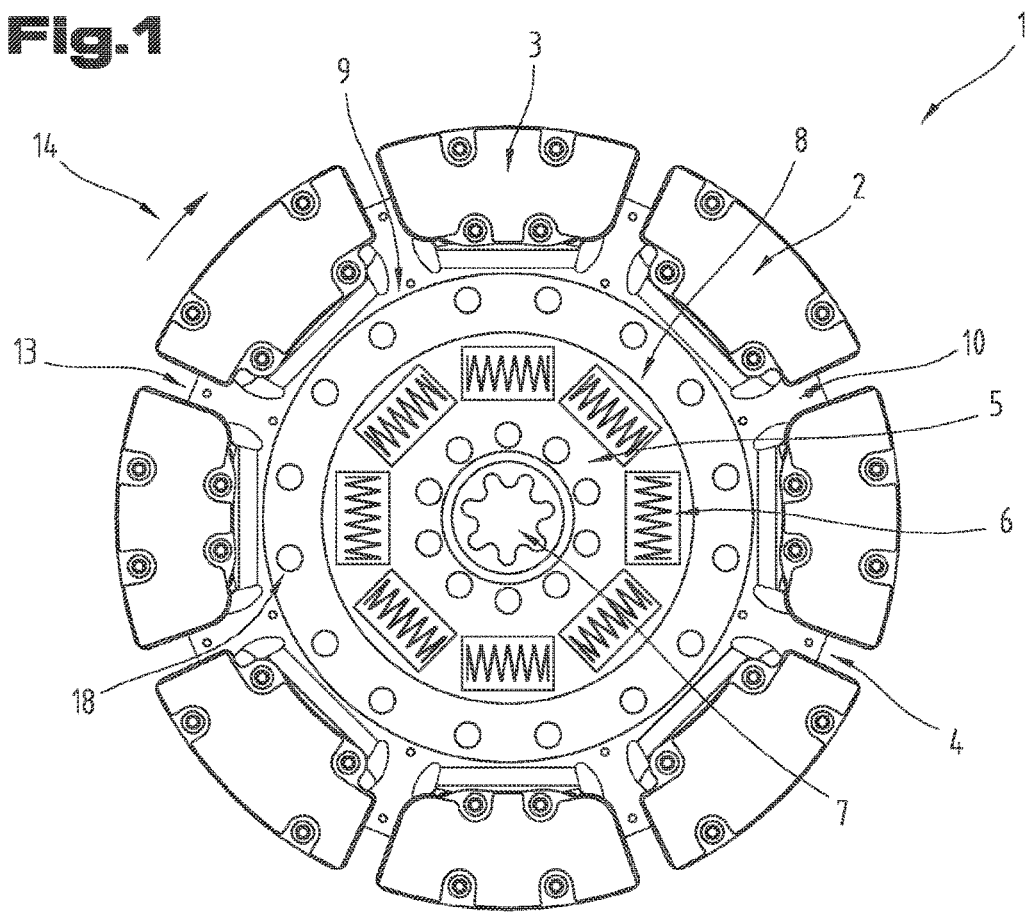

| | | | | |
|---|---|---|---|---|
| 1,956,828 | A | * | 5/1934 | Fink ................ F16D 13/64 192/107 C |
| 2,008,169 | A | * | 7/1935 | Blackmore .......... F16D 13/64 192/107 C |
| 2,035,916 | A | * | 3/1936 | Pope ................ F16D 13/64 192/107 C |
| 2,101,410 | A | * | 12/1937 | Nutt ................ F16D 13/64 192/107 C |
| 2,244,134 | A | * | 6/1941 | Thelander .......... F16D 13/64 192/107 C |
| 2,308,604 | A | * | 1/1943 | Goodwin ............ F16D 13/64 192/107 C |
| 4,278,162 | A | * | 7/1981 | Frichette .......... F16D 13/64 192/107 C |
| 4,869,356 | A | * | 9/1989 | Cameron ............ F16D 13/64 192/107 M |
| 5,322,149 | A | | 6/1994 | Szadkowski |
| 5,857,551 | A | | 1/1999 | Yoneda |
| 2006/0191767 | A1 | | 8/2006 | Hassler et al. |

FOREIGN PATENT DOCUMENTS

| | | | |
|---|---|---|---|
| DE | 701985 | C | 1/1941 |
| DE | 901 479 | C | 1/1954 |
| DE | 1210686 | B | 2/1966 |
| DE | 2920095 | A1 | 11/1980 |
| DE | 4226762 | A1 | 2/1994 |
| DE | 19634534 | A1 | 3/1998 |
| DE | 199 36 020 | A1 | 2/2000 |
| DE | 100 41 216 | A1 | 3/2002 |
| DE | 10 2004 038 805 | A1 | 2/2006 |
| FR | 718 429 | A | 1/1932 |
| GB | 431075 | A | 7/1935 |
| GB | 473378 | A | 10/1937 |
| GB | 1418890 | A | 12/1975 |
| GB | 2 278 894 | A | 12/1994 |
| GB | 2269641 | B | 1/1996 |
| WO | 2006/086949 | A1 | 8/2006 |
| WO | WO-2006136131 A1 * | 12/2006 | ............ F16D 13/64 |

\* cited by examiner

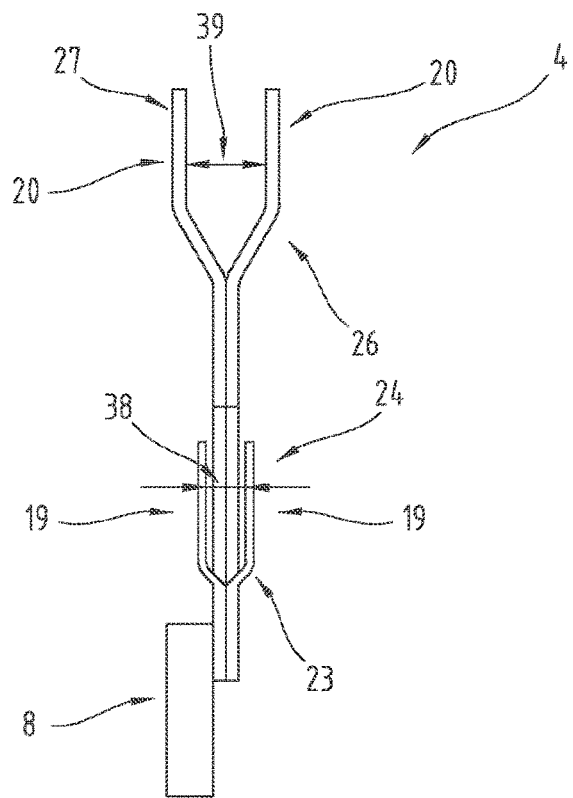
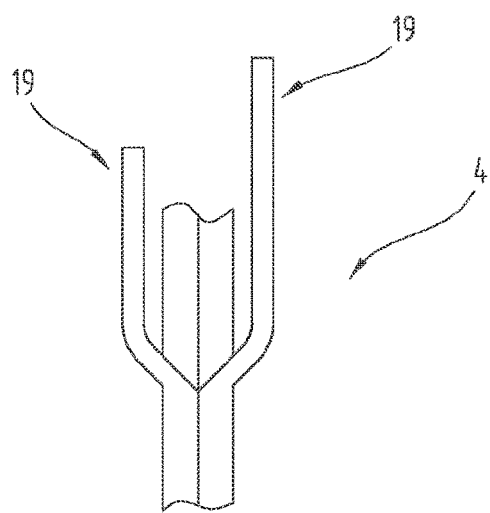
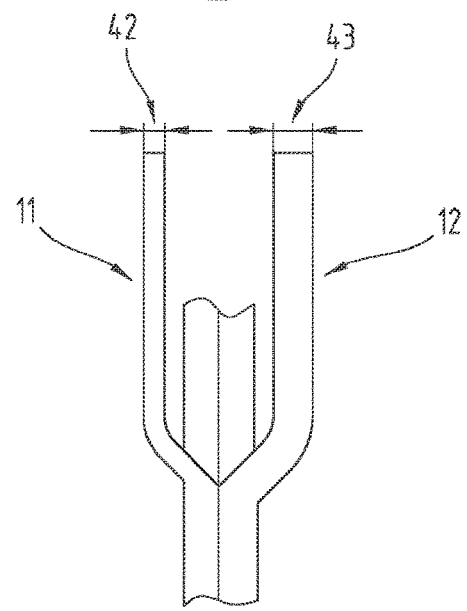

SPRING ELEMENT FOR A FRICTION DEVICE

CROSS REFERENCE TO RELATED APPLICATIONS

This application is the National Stage of PCT/AT2015/050083 filed on Mar. 31, 2015, which claims priority under 35 U.S.C. § 119 of Austrian Application No. A 50241/2014 filed on Apr. 1, 2014, the disclosure of which is incorporated by reference. The international application under PCT article 21(2) was not published in English.

The invention relates to a spring element for a friction device, in particular a clutch disk for a friction clutch, comprising a spring element body having a first spring element body part and a second spring element body part disposed one behind the other in the axial direction and in contact with one another in some regions, and each spring element body part has receiving areas for friction linings disposed adjacent to one another in a circumferential direction so that the friction linings can be disposed on either side of the spring element body and secured thereto. The invention further relates to a friction device, in particular a clutch disk for a friction clutch, comprising a disk-shaped main body with a support element, the support element having an external circumference around which several friction groups are distributed, and the friction groups respectively have a first friction lining and a second friction lining disposed behind it in the axial direction.

Numerous designs for clutch disks with friction linings have already been described in the prior art.

For example, DE 29 20 095 A1 describes a friction lining mounting, in particular for metal and/or metal-ceramic friction linings, of motor vehicle clutch plates, amongst other things comprising friction linings retained in mountings which are disposed in opposite pairs on resilient lining supports, two identical lining supports being disposed respectively in an alternating arrangement with their cambers convexly facing one another, and each friction lining together with its mounting is connected to the co-operating lining support via at least two rivets and all of the rivets of the two oppositely lying lining supports are distributed in the available surface so as to obtain a symmetrical distribution relative to a line of symmetry, in particular of the lining supports, positioned so that they do not mutually overlap. In the region where the rivet of the oppositely lying lining support protrudes, every lining support has co-operating orifices. The mountings of the friction linings have orifices that are likewise congruent with the lining supports. At least one spacer rivet is disposed between the lining supports on the line of symmetry for pre-tensioning the lining supports.

The reason why friction linings are disposed on resilient lining supports is primarily to ensure that the metal and/or metal-ceramic friction linings are not subjected to impacts or shocks on meshing, which could result in premature damage to these friction linings under certain circumstances. Compared with other friction linings, for example made from resin-bonded fibers, such metal and/or metal-ceramic friction linings are significantly less elastic. On the other hand, these metal and/or metal-ceramic friction linings offer an advantage compared with other friction linings in that they are capable of transmitting higher torques. Providing a resilient mounting for the friction linings also enables the controllability of the clutch to be improved on engagement.

Figure 2:
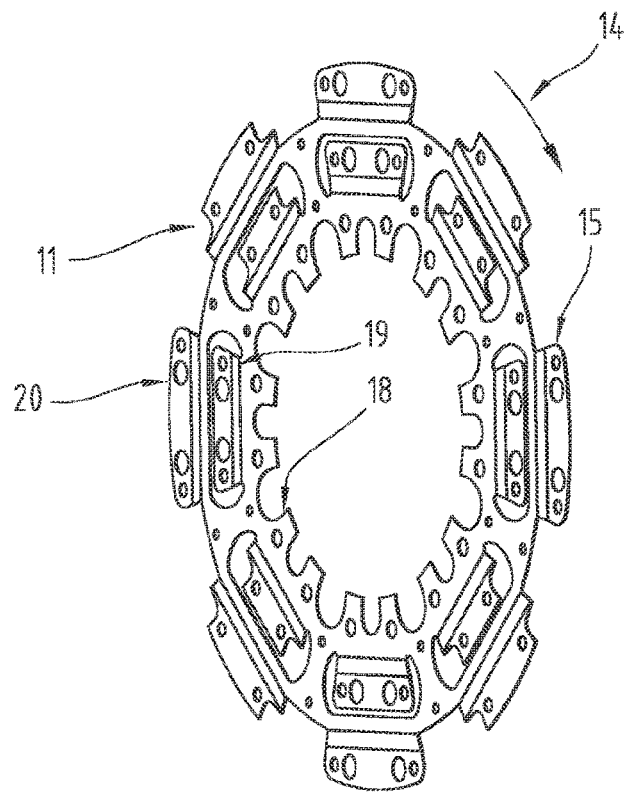

U.S. Pat. No. 5,857,551 A describes various embodiments of a clutch disk. In a first embodiment, the friction linings are split into three friction groups and two friction linings are disposed adjacent to one another on the lining supports in the circumferential direction, as illustrated in FIG. 2 of U.S. Pat. No. 5,857,551 A. Based on this variant of the clutch disk described in U.S. Pat. No. 5,857,551 A, there are not two friction linings respectively on separate, wing-type lining supports, such as described in DE 29 20 095 A1.

Based on this first variant of the clutch disk described in U.S. Pat. No. 5,857,551 A, the friction linings are secured to the lining supports on the one hand by caulking and on the other hand by rivets, and the actual friction linings themselves are sintered onto friction lining supports. In order to caulk the friction lining supports to the lining supports, the latter are bent on three sides and also have a bent tab so that the friction lining supports are connected to the lining supports by a positive connection on all sides.

Based on this variant, the friction linings are secured in a resilient arrangement on the one hand, as described in DE 29 20 095 A1, and a rigid arrangement due to the caulking on the other hand.

Figure 5:
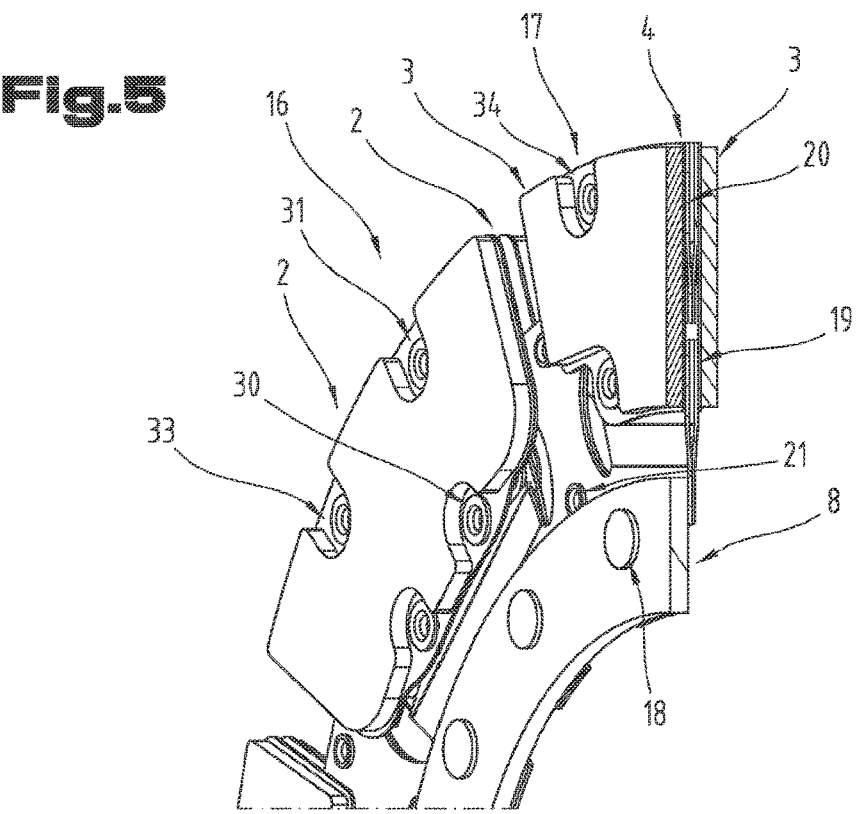

U.S. Pat. No. 5,857,551 A describes another variant of a clutch disk which, similarly to DE 29 20 095 A1, has two friction linings respectively disposed on separate, wing-type lining supports. In the case of this embodiment, which is illustrated in FIG. 5 of U.S. Pat. No. 5,857,551 A, the lining supports are therefore only about half as big as those of the first variant. In this connection, U.S. Pat. No. 5,857,551 A states that all the friction linings are secured in a resilient arrangement, in a manner already known from DE 29 20 095 A1. Accordingly, this is a departure from the idea of rigidly securing a part of the friction linings.

The underlying objective of this invention is to propose a clutch disk of the type outlined above and generally to improve a friction device, in particular in terms of its friction behavior.

This objective is achieved on the one hand by the spring element mentioned above and on the other hand by the friction device mentioned above. To this end, in the case of the spring element, the first spring element body part and the second spring element body part are of an at least approximately annular shape and for each receiving area for the friction linings, a first receiving tab and a second receiving tab is provided, and the first receiving tab is disposed underneath the second receiving tab in the radial direction, and in particular the first receiving tab and the second receiving tab of each and every receiving area for the friction linings of the first spring element body part are formed by the first spring element body part and the first receiving tab and the second receiving tab of each and every receiving area for the friction linings of the second spring element body part are formed by the second spring element body part.

In the case of the friction device, the objective is achieved due to the fact that the first and second friction linings are connected to a spring element proposed by the invention, optionally with a friction lining support disposed respectively in between, and the spring element is connected to the support element, and the spring element is disposed between the first and second friction linings.

Providing the spring element enables a design of clutch disk or friction device to be obtained that is capable of withstanding speed. The breakdown torque resulting from the centrifugal force of the individual segments, i.e. the individual friction linings, is supported by two separate tabs based on this construction, and the bottom tab is subjected to tensile load and thus exhibits a high degree of stiffness on exposure to the breakdown torque. Deflection of the spring tabs, i.e. the receiving tabs, due to the effect of speed is therefore very low compared with the prior art. The clutch modulation can be configured so as to be virtually the same at different speeds. By providing individual damping for each friction lining, a very homogeneous contact pattern can be achieved for the friction linings. By providing two receiving tabs per friction lining, the stiffness of the friction device can be better adjusted.

In order to reduce mounting space in the axial direction and to reduce the weight of the spring element or friction device, the first receiving tabs of the first spring element body part may be disposed respectively at least partially in a cut-out of the first spring element body and/or the first receiving tabs of the second spring element body part may be disposed respectively at least partially in a cut-out of the second spring element body.

Furthermore, in order to set the axial stiffness for individual ones or several of the friction linings, at least one of the following features may be provided:
- at least one of the first receiving tabs is shorter in the radial direction than the second receiving tabs in the radial direction and/or at least one of the second receiving tabs is shorter in the radial direction than the first receiving tabs in the radial direction, and/or
- a maximum distance between first receiving tabs of at least one pair of first receiving tabs disposed one behind the other in the axial direction is shorter or longer than a maximum distance between two second receiving tabs disposed one behind the other in the axial direction, and/or
- at least one of the receiving tabs of receiving tabs disposed adjacent to one another in the circumferential direction of the spring element body is shorter in the radial direction than the other receiving tabs in the circumferential direction, and/or
- a maximum distance between first receiving tabs of at least one pair of first receiving tabs disposed one behind the other in the axial direction is longer than the maximum distance between two first receiving tabs of the other pair of first receiving tabs disposed adjacent to one another in the circumferential direction of the spring element body and/or a maximum distance between second receiving tabs of at least one pair of second receiving tabs disposed one behind the other in the axial direction is bigger than the maximum distance between two second receiving tabs of the other pair of second receiving tabs disposed adjacent to one another in the circumferential direction of the spring element body, and/or
- at least one of the receiving tabs has a shorter maximum tab width in the direction of the circumferential direction of the spring element body than the rest of the receiving tabs.

In addition to improving the ability to set the axial stiffness of the friction linings, another advantage of these features is that they have no or little effect on the torsional strength and bending strength of the friction device. It is therefore possible to set different spring paths at least for individual ones of the friction linings so that at least individual friction linings engage with the co-operating friction element or co-operating friction device with different release paths. By mounting the friction linings individually, a predefined tilted position can be set relative to the co-operating friction partners. Furthermore, for the same wall thickness of the spring element and/or spring element parts and the same tab width, the axial stiffness can be set virtually independently of the ability to withstand speed.

In addition, the two spring element body parts are each of an integral design, thereby making it possible to impart to the spring element as a whole an at least approximately constant intrinsic stiffness across the entire surface, so that the stiffness behavior of the friction linings, i.e. the receiving tabs for the friction linings, on engagement can be set more easily and more accurately.

In addition, the first spring element body part has a wall thickness, at least in the region of the receiving tabs, and the second spring element body part has a wall thickness, at least in the region of the receiving tabs, and the wall thickness in the region of at least one of the receiving tabs of the first spring element body part is slimmer than the wall thickness in the region of the receiving tabs of the second spring element body part.

To provide a clearer understanding, the invention will be described in more detail below with reference to the appended drawings.

Figure 6:
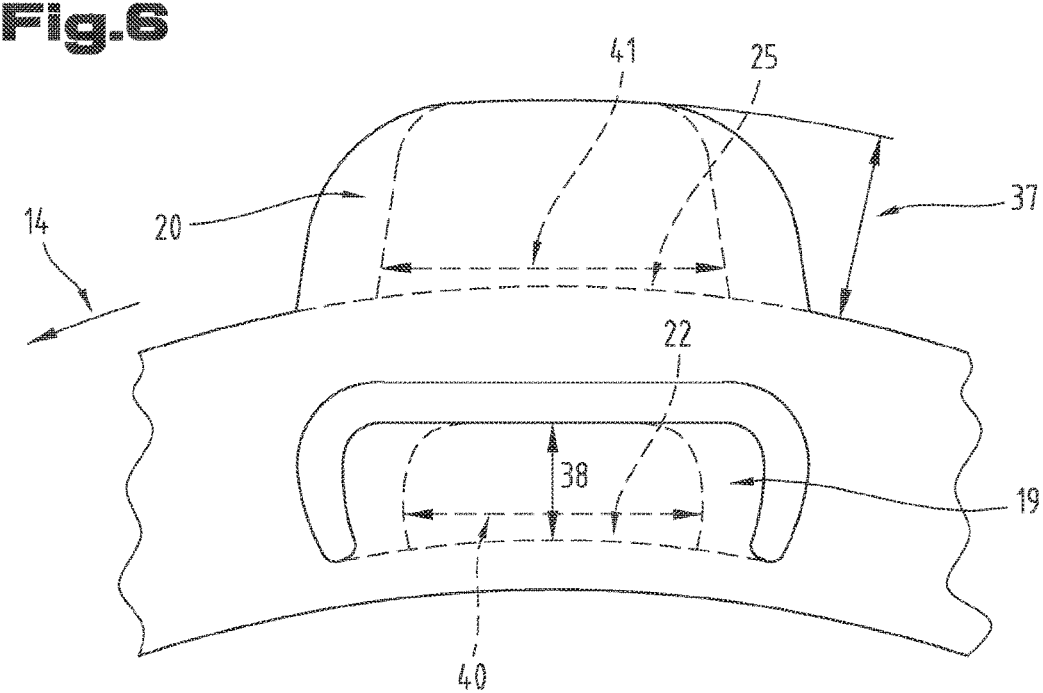
Figure 3:
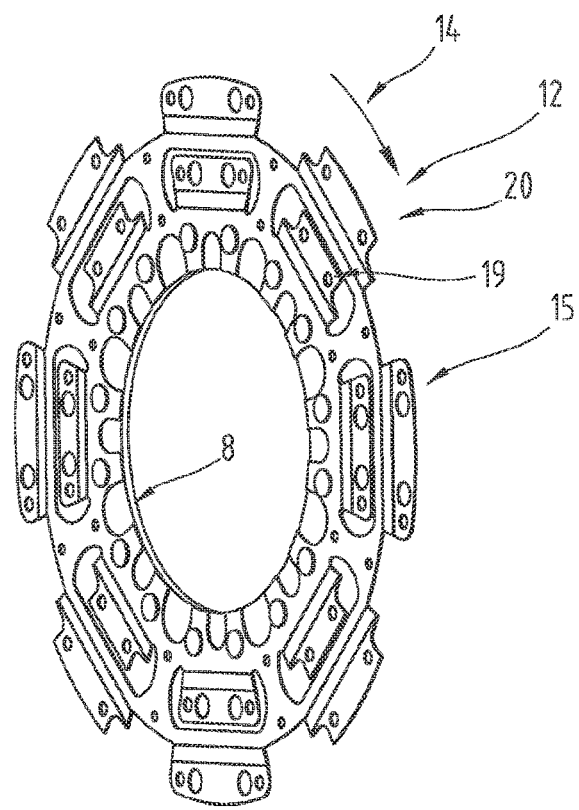
Figure 4:
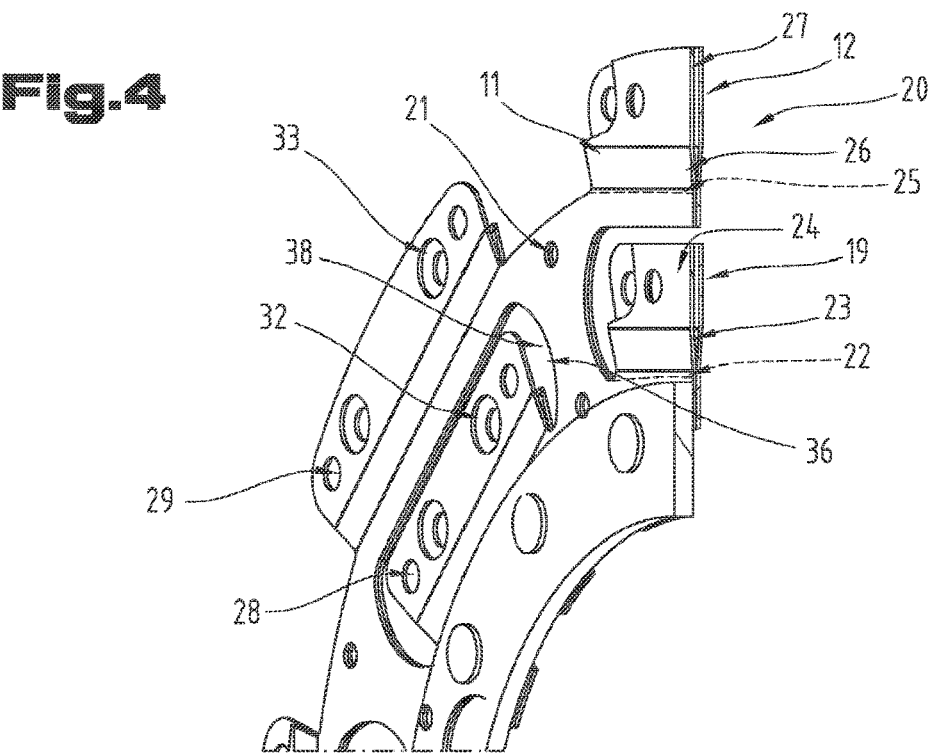

These are simplified, schematic diagrams illustrating the following:

FIG. 1 one embodiment of a clutch disk viewed in the axial direction;

FIG. 2 a first spring element part viewed from an angle;

FIG. 3 a second spring element part viewed from an angle;

FIG. 4 a detail of a spring element viewed from an angle;

FIG. 5 the detail of the spring element illustrated in FIG. 4 but with friction linings;

FIG. 6 a detail of an embodiment of a spring element in an axial view;

FIG. 7 another embodiment of a spring element viewed from the side, in section;

FIG. 8 a detail of another embodiment of a spring element viewed from the side, in section;

FIG. 9 a detail of another embodiment of a spring element viewed from the side, in section.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a friction device in the form of a clutch disk 1 for a friction clutch that is known per se from the prior art.

The clutch disk 1 is the preferred embodiment of the friction device. However, within the scope of the invention, other friction devices are also possible, e.g. brakes or, more generally, biasing elements (in the form of a disk spring).

The clutch disk 1 may essentially correspond to that known from the prior art. By essentially is meant that—as will be explained in more detail below—there are differences in structure in terms of the provision of friction linings 2, 3 and a spring element 4.

Accordingly, the clutch disk 1 comprises a main body 5 which is disk-shaped in particular. Disposed on and/or in the main body 5 are several torsion springs 6. However, it is not absolutely necessary to provide the torsion springs 6 and providing them in the clutch disk 1 is purely optional. Furthermore, an orifice 7 is provided at the center for receiving a shaft, not illustrated. Since this aspect is known in principle from the prior art, reference may be made to the relevant literature for further details.

The main body 5 comprises a disk-shaped support element 8. The support element 8 is disposed at least in the region of an external circumference 9 of the main body 5. The support element 8 may extend across the surface—viewed in the axial direction—of the entire main body 5, in other words from the orifice 7 to the external circumference 9. The orifice 7 may therefore (also) be provided in the support element 8. In this case, the torsion springs 6 may (also) be disposed in co-operating mountings in the support element 8.

However, the support element 8 may also be of an annular shape, in which case it is disposed only in the region of the circumference 9, in other words it does not extend radially as far as the region of the orifice 7.

Another option is to provide cover elements (not illustrated) in at least certain regions on either side of the support element 8, these being disk-shaped in particular.

The support element 8 is preferably made from sheet metal, in particular steel sheet.

It is preferable if the support element 8 is of an integral design, in other words is not an assembly of several parts.

Disposed on the support element 8 and connected to it is the spring element 4.

The spring element 4 comprises a spring element body 10. This spring element body 10 comprises a first spring element body part 11 which is illustrated in FIG. 2 and a second spring element body part 12 which is illustrated FIG. 3 and/or comprises the first and second spring element body parts 11, 12.

As may be seen in particular from both FIGS. 2 and 3, the two spring element body parts 11, 12 are of an at least approximately annular shape. In this respect, it is preferable if the two spring element body parts 11, 12 are each made in one piece, in particular as punched parts. Based on another but not preferred embodiment of the spring element 4, however, at least one but also both of these spring element body parts 11, 12 may be made from several parts, for example, in which case the individual parts used to make the respective spring element body part 11 and/or 12 or both of the annular spring element body parts 11, 12 are joined to one another.

Distributed and/or arranged around a spring element circumference 13 along a circumferential direction 14 are several adjacently disposed and in particular mutually spaced apart receiving areas 15 for the friction linings 2, 3. The friction linings 2, 3 are not provided in the form of a ring, i.e. a closed ring like the spring element body 11, 12, but in the form of discrete segments lying adjacent to one another in the circumferential direction 14 and spaced apart from one another. As may be seen in particular from FIG. 5, the friction linings 2, 3 are disposed respectively on either side of the spring element 4. Accordingly, a friction lining 2 is respectively disposed behind a friction lining 3 in the axial direction. In the circumferential direction of the clutch disk 1, the friction linings are disposed respectively in an alternating arrangement on the spring element body parts 11, 12 adjacent to one another. A friction lining 2 and a friction lining 3 therefore respectively form a friction group 16 and/or 17, as may be seen in FIG. 5.

However, another option, although this is not the preferred embodiment, is for one of the friction linings 2 to be disposed respectively in alignment with one of other friction linings 2 respectively in the axial direction and one of the friction linings 3 respectively to be disposed in alignment respectively with one of other friction linings 3 respectively in the axial direction so that two friction linings 2 respectively and two friction linings 3 respectively form a friction group 16 and/or 17.

In the case of the embodiment of the clutch disk 1 illustrated, four receiving areas 15 for the friction linings 2 respectively and four receiving area 15 for the friction linings 3 respectively are provided per spring element body part 11, 12. However, it would also be possible to provide a different number of friction linings 2 and/or friction linings 3, for example only two or three, or more than four, for example five or six friction linings 2 and/or friction linings 3.

Furthermore, only two geometrically different friction linings 2, 3 are illustrated in the drawings. Again, it would also be possible to provide more than two geometrically different friction linings 2, 3, for example three, four, etc. In the extreme case, only the two friction linings 2 or 3 respectively of a friction group 16 or 17 may be geometrically identical, and even in this case, there may be a geometric difference of the friction linings 2, 3 of a friction group 16, 17.

The spring element body parts 11, 12 are connected to the support element 8. To this end, it is preferable to provide bores both in the spring element body parts 11, 12 and in the support element 8 so that the spring element body parts 11, 12 are connected to the support element 8 by a plurality of rivets 18 which extend through these bores.

Instead of or in addition to rivets 18, fixing, i.e. the connection of the spring element body parts 11, 12 to the support element 8, may also be based on a non-positive and/or firmly bonded and/or positive fit, whereby the end region of the spring element body parts 11, 12 facing the support element 8 is bent round by at least approximately 90° and inserted in a corresponding slot-shaped seating of the support element 8.

The two spring element body parts 11, 12 are preferably disposed on one side (as viewed in the axial direction) of the support element 8, as illustrated in the drawings. However, another option would be for the support element 8 to be partially disposed between the two spring element body parts 11, 12.

It should be pointed out that the support element 8 does not extend as far as the outer circumference or external diameter of the clutch disk 1.

Each spring element body part 11, 12 has friction linings 2, 3 on only one side respectively—as viewed in the axial direction—so that the two spring element body parts 11, 12 are disposed between the friction linings 2, 3 in the axial direction, as may be seen in FIG. 5, for example. As a result, the two spring element body parts 11, 12 preferably lie directly behind one another in the axial direction, and the two spring element body parts 11, 12 lie in contact with one another in only certain regions, as may be seen in FIG. 4, for example, and as will be explained in more detail below.

For each receiving area 15, the spring element 4 has at least two, in particular exclusively two, receiving tabs, namely a first receiving tab 19 and a second receiving tab 20. These receiving tabs 19, 20 are therefore located on the two spring element body parts 11, 12. Two first receiving tabs 19 respectively two second receiving tabs 19 respectively are preferably disposed one behind the other in the axial direction per friction group 16, 17. In particular, these receiving tabs 19, 20 are integral with the spring element body 11 or 12 and/or are formed by them. However, it would also be possible for the receiving tabs 19, 20 to be separate components in each case, which are connected to the spring element body parts 11, 12, for example by means of rivets or screws and/or by a firmly bonded connection, e.g. welded or soldered or glued, and/or by a positive connection.

As viewed in the axial direction, two receiving tabs 19 and two receiving tabs 20 are disposed respectively behind one another. The receiving tabs disposed behind one another may be of the same size but may also be of a different size, as will be explained in more detail below.

As viewed in the radial direction, the first receiving tabs 19 are disposed underneath the second receiving tabs 20. The spring element 4 therefore has radially inner receiving tabs 19 and radially outer receiving tabs 20 for friction linings 2, 3.

The two spring element body parts 11, 12 are preferably connected to one another, i.e. the spring element body parts 11, 12 are not only connected to the support element 8 in the region of the support element 8 by means of the rivets 18 and hence also to one another, but rather additional rivets 21 are provided, by means of which the two spring element body parts 11, 12 are connected to one another. These rivets 21 are preferably not disposed in the region of the receiving tabs 19, 20 but adjacent to the receiving tabs 19, 20 as viewed in the circumferential direction 14, as may be seen in particular from FIGS. 4 and 5.

Instead of or in addition to connecting the two spring element body parts 11, 12 by means of the rivets 21, the spring element body parts 11, 12 may also be connected by a firmly bonded connection, in particular by welding, or by gluing, and/or by a positive connection, e.g. by folding.

As may be seen in particular from FIG. 4 and, the two spring element body parts 11, 12 are in contact with one another in only certain regions. In the region of the receiving tabs 11, 12, they are at least partially spaced apart from one another, thereby generating the springing action of the receiving tabs 11, 12 when subjected to pressure. In order to create this spacing, the receiving tabs 19 and 20 of the first spring element body part 11 in the axial direction are bent forwards out of the plane of the first spring element body part 11 and the receiving tabs 19 and 20 of the second spring element body part 12 in the axial direction are bent backwards out of the plane of the second spring element body part 11. Accordingly, starting from a base 22 (indicated by broken lines in FIG. 4), the receiving tabs 19 have a first oblique tab part 23 (oblique relative to the plane of the first spring element body part 11 and/or second spring element body part 12 perpendicular to the axial direction of the clutch disk 1) and, adjoining it, a second tab part 24 which extends at least approximately parallel with the plane of the first spring element body part 11 and/or second spring element body part 12 perpendicular to the axial direction of the clutch disk 1. Similarly, starting from a base 25 (indicated by broken lines in FIG. 4), the second receiving tabs 20 have a first oblique tab part 26 (oblique relative to the plane of the first spring element body part 11 and/or second spring element body part 12 perpendicular to the axial direction of the clutch disk 1) and adjoining it, a second tab part 27 which extends at least approximately parallel with the plane of the first spring element body part 11 and/or second spring element body part 12 perpendicular to the axial direction of the clutch disk 1.

Within the scope of the invention, it is possible for each of the receiving tabs 19, 20 to be provided with more than one oblique tab part 23, 26, for example two or three, etc., in which case these may have a different inclination from the first oblique tab parts 23, 26.

Another possibility is to provide no parallel tab parts 24, 27 on the receiving tabs 19, 20, but instead only one or more oblique tab parts 23, 26 which may in turn have a different inclination with respect to the aforementioned plane. However, the provision and/or disposition of the parallel second tab parts 24, 27 offers the advantage of improving the ability to connect the friction linings 2, 3 to the receiving tabs 19, 20.

In the case of the embodiment of the spring element 4 illustrated in the drawings, the base 22 and the base 25 are disposed respectively underneath said tab parts 23 and 27 in the radial direction. However, it would also be possible for the base 22 to be disposed above the first oblique tab part 23 for example, so that the receiving tabs 19 are disposed in the reverse arrangement from that shown in FIG. 4, in other words extending not in the direction radially outwards but in the direction radially inwards from the base 22. In this respect, it may be that not all the receiving tabs 19 are disposed in this reverse arrangement but only some of them, e.g. every second one in the circumferential direction 14. Based on this design, the base 22 and the base 25 of at least individual ones of the first receiving tabs 19 and second receiving tabs 20 lie adjacent to one another as viewed in the radial direction so that at least individual ones of the receiving tabs 19, 20 are arranged in a butterfly pattern.

However, it may be that the direction of at least individual ones of the radially outer second receiving tabs 20 is reversed so that at least individual ones, for example every second one in the circumferential direction 14, extend radially inwards from the base 25 rather than radially outwards as illustrated.

In order to attach the friction linings 2, 3 to the receiving tabs 19, 20, the latter have bores 28, 29 and/or cut-outs so that the friction linings 2, 3 can be riveted by means of rivets 30, 31. In this respect, it is preferable if every second one of the bores 28, 29 is provided with an indentation 32, 33 and/or countersinking in one of the two spring element body parts 11, 12. As a result, once two friction linings 2, 3 have been assembled respectively one behind the other in the axial direction of the clutch disk 1 to create the friction groups 16, 17, the rivets 30, 31 of a friction lining 2, 3, i.e. the rivet heads, do not cause problems when the second friction lining 2, 3 is secured. The rivet heads are accommodated in these indentations 32, 33 and do not protrude from the surface of the respective receiving tab 19, 20.

In principle, however, the friction linings 2, 3 may also be connected to the receiving tabs 19, 20 in some other way, for example by screws, adhesive or welding, in which case it is not absolutely necessary to provide bores 28, 29 in the receiving tabs 19, 20.

The friction linings 2, 3 preferably each have a friction lining support 33, 34 to which they are secured, in particular sintered, or to which they are adhered or soldered, and by means of which they are secured on the receiving tabs 19, 20, as may be seen from FIG. 5 for example. The friction linings 2, 3, may also be directly connected to the receiving tabs 19, 20, for example adhered, although this is not the preferred embodiment.

Furthermore, the friction linings 2, 3 have a height (as viewed in the axial direction of the clutch disk 1) which is greater than a height of the rivet heads of rivets 30, 31 if the friction linings 2, 3 are riveted.

If the friction linings 2, 3 are riveted to the receiving tabs 19, 20, one option is to provide the friction lining support 33, 34 with an indentation in the region of the rivet head, and an internal dimension of the indentation is bigger than the external dimension of the rivet head so that the rivet head is at least partially accommodated in this indentation.

As already explained, the two spring element body parts 11, 12 are disposed between the friction linings 2, 3 as viewed in the axial direction of the clutch disk 1, in other words preferably between the friction lining supports 34, 35. Amongst other things, this enables the size of the spacing of the receiving tabs 19, 20 as well as the spring characteristic or spring path to be set. All of the friction linings 2, 3 of the clutch disk 1 are preferably retained so as to afford a springing action.

To this end, the first friction linings 2 and the second friction linings 3 are preferably made from a metal or metal-ceramic sintered material of the type used as standard for this purpose. However, it would also be possible to use other materials, such as resin-bonded fiber materials, for example. These types of friction linings 2, 3 are described at length in the relevant literature and reference may be made to the latter.

For details of the adhesives which may be used to create adhesion points, reference may also be made to the relevant literature, given that the ways of adhering friction linings are known per se.

The friction lining support 34, 35 may be made from an iron-based material, for example steel, in particular a construction steel or a heat treatable steel. Other suitable materials may also be used, e.g. a brazing sheet made from an iron-based material, for example steel, in particular a construction steel or a heat treatable steel.

In particular, the spring element body parts 11, 12 may be made from a heat resistant spring steel.

Other and optionally independent embodiments of the spring element 4 or friction device, in particular the clutch disk 1, will be described below, the same reference numbers and component names being used to denote parts that are the same as those described above. To avoid unnecessary repetition, reference may be made to the more detailed description given above.

Based on a preferred embodiment of the spring element 4, the radially inner first receiving tabs 19 are disposed in a cut-out 36 of the respective spring element body part 11, 12, as may be seen from FIG. 4 for example. These cut-outs 36 are big enough to ensure that the first receiving tabs 19 are not prevented from moving freely. The shape and geometry of the cut-outs 36 will depend in particular on the shape and geometry of the first receiving tabs 19.

As explained above, the spring element 4 offers the possibility of individually setting every friction lining 2, 3 in terms of its stiffness in the axial direction when the friction device, in particular the clutch disk 1, is engaged, once each friction lining 2, 3 has been secured to a radially inner first receiving tab 19 and a radially outer second receiving tab 20. In particular, the stiffness behavior of the friction linings 2, 3 can be set on the basis of the size of the receiving tabs 19, 20 and/or the mounting angle of the receiving tabs 19, 20 and/or the wall thickness of the receiving tabs 19, 20.

Accordingly, based on another embodiment of the spring element 4, the radially inner first receiving tab 19 or the radially outer second receiving tab 20 disposed above the first receiving tabs 19 in the radial direction is shorter in the radial direction than the respective other receiving tab 20, 19 for a friction lining 2, 3. As illustrated in FIG. 6 for example, the radially outer second receiving tab 20 is provided with a maximum tab height 37 that is bigger than a maximum tab height 38 of the radially inner first receiving tab 19. The maximum tab height 37, 38 is defined as being the respective distance of the radially outermost point of the respective receiving tab 19, 20 from the respective base 22 or 25, and the respective base 22 or 25 of the receiving tabs 19 respectively 20 as a rule extends at the point of transition between the mutually abutting and spaced apart parts of the receiving tabs 19, 20 respectively of the spring element body parts 11, 12, as may be seen in FIG. 4 for example.

However, it is also possible to opt for the converse arrangement, in which case the radially inner first receiving tabs 19 have a greater maximum tab height 38 in the radial direction than the second radially outer receiving tabs 20. A mixed variant is likewise possible, whereby some of the radially inner first receiving tabs 19, for example every second one in the circumferential direction 14, have a higher tab height 38 than the radially outer second receiving tabs 20 and/or some of the radially outer second receiving tabs 20, for example every second one in the circumferential direction 14, have a higher tab height 37 than the radially inner first receiving tabs 19. Furthermore, the maximum tab height 37 of at least individual ones of the first radially inner receiving tabs 19 and/or the maximum tab height 38 of at least individual ones of the second radially outer receiving tabs 20 are respectively different from one another, i.e. not all the first radially inner receiving tabs 19 have the same maximum tab height 37 and/or not all of the second radially outer receiving tabs 20 have the same maximum tab height 38.

Generally speaking, therefore, at least one of the receiving tabs 19, 20 of the spring element 4 may have a smaller or larger maximum tab height 37, 38 in the radial direction than the rest of the receiving tabs 19, 20 of the spring element 4.

Based on another embodiment, as an alternative to or in addition to the previous embodiment, a maximum tab distance 38 in the axial direction between two receiving tabs 19 or 20 of a friction group 16, 17 is greater than the maximum tab distance 39 between two receiving tabs 20 or 19 of the same friction group 16, 17, i.e. the receiving tabs 19, 20 having the tab distance 37 are disposed underneath or above these receiving tabs 19, 20 having the maximum tab distance 38 in the radial direction. In this connection, FIG. 7 illustrates a detail of an embodiment based on this design of the spring element 4. Here, the maximum tab distance 39 between two second radially outer receiving tabs 20 is greater than the tab distance 38 between two first radially inner receiving tabs 19 of the friction group 16 (illustrated in FIG. 5).

In this respect, the maximum tab distance 38, 39 is the greatest distance between two receiving tabs 19 respectively 20, measured between the surfaces pointing towards one another.

Different designs are also possible on the basis of this embodiment of the spring element 4. For example, all or some pairs of first radially inner receiving tabs 19, for example every second one in the circumferential direction 14, may have a shorter tab distance 38 than the corresponding second radially outer receiving tabs 20. It is likewise possible for all or some of the second pairs of radially outer receiving tabs 20, for example every second one in the circumferential direction 14, to have a shorter tab distance 39 than the corresponding first radially inner receiving tabs 19. Also possible are embodiments in which both some of the first radially inner receiving tabs 19, for example every second pair in the circumferential direction 14, and some of the second radially outer receiving tabs, for example every second pair in the circumferential direction 14, have a shorter tab distance 38 respectively 39 than the corresponding receiving tabs 19, 20 of the respectively associated receiving tabs 19, 20 of a friction group 16 respectively 17. Another possibility in this connection is to provide an offset in the circumferential direction 14, i.e. one pair of radially inner first receiving tabs 19 having the shorter tab distance 38, followed in the circumferential direction 14 by a pair of second radially outer receiving tabs 20, then followed in the circumferential direction 14 by a pair of first radially inner receiving tabs 19, etc.

With these embodiments, it may also be of advantage if the receiving tabs do not have the parallel second tab part 24 respectively 27 illustrated in FIG. 7 and instead have only the first oblique tab part 23 respectively 26, and the oblique angle is such that the friction lining support 34, 35 or the friction lining 2, 3 lies flat on the receiving tabs 19, 20. To this end, however, the second tab part 24 respectively 27 could also extend in an oblique arrangement, for example, at an oblique angle that is different from the oblique angle of the first tab parts 23 respectively 26.

For details of the first and second tab parts 23, 26 and 24, 27, reference may be made to the description given above.

Alternatively or in addition to this embodiment or this variant of the spring element 4, based on another embodiment, at least one of the first radially inner receiving tabs 19 of adjacently disposed first radially inner receiving tabs 19 in the circumferential direction 14 of the spring element body 11 or 12 is shorter in the radial direction than the first radially inner receiving tabs 19 of the same friction group 16 or 17.

An example of this embodiment is illustrated in FIG. 8. In this instance, a first radially inner receiving tab 19 (illustrated on the left in FIG. 8) is shorter in the radial direction than a second first radially inner receiving tab 19 (illustrated on the right in FIG. 8) lying opposite the first radially inner receiving tab 19 in the axial direction.

Another option is one whereby a second radially outer receiving tab 20 (not illustrated in FIG. 8) is shorter in the radial direction than a second second radially outer receiving tab 20 (not illustrated in FIG. 8) lying opposite the first radially inner second receiving tab 19 in the axial direction. Another option is one whereby within a friction group 16, 17, both a first radially inner and second radially outer receiving tab 19, 20 are shorter in the radial direction than the corresponding receiving tabs 19, 20 lying opposite these receiving tabs 19, 20 in the axial direction. In addition, it is also possible that of two adjacently disposed receiving tabs 19 and/or receiving tabs 20 in the circumferential direction 14, one respectively is shorter in the radial direction than the other first radially inner receiving tab 19 and/or second radially outer receiving tab 20. Another option is one whereby in the circumferential direction 14, a first radially inner receiving tab 19, adjoined by a second radially outer receiving tab 20, in turn adjoined by a first radially inner receiving tab 19, etc., of a spring element body part 11 and/or spring element body part 12 is shorter in the radial direction.

Based on another embodiment of the spring element 4 (again as an alternative or in addition to the previous embodiments) at least one of the first radially inner receiving tabs 19 in the direction of the circumferential direction 14 of the spring element body 10 has a shorter maximum tab width 40 than the other receiving tabs 19, 20, as indicated by broken lines in FIG. 6.

However, it may also be that at least one of the second radially outer receiving tabs 20 in the direction of the circumferential direction 14 of the spring element body 10 has a shorter maximum tab width 41 than the other receiving tabs 19, 20.

Several embodiments are again possible based on this aspect. For example, every second first radially inner receiving tab 19 in the circumferential direction 14 may have a shorter tab width 40 and/or every second second radially outer receiving tab 20 in the circumferential direction 14 may have a shorter tab width 41. Also possible are shorter first and second receiving tabs 19, 20 disposed in an alternating arrangement, as described above.

Based on another embodiment of the spring element 4 (again as an alternative to or in addition to the previous embodiments), the first spring element body part 11 has a wall thickness 42, at least in the region of at least one of the receiving tabs 19 and/or receiving tabs 20 (preferably of the entire spring element body part 11), that is slimmer than a wall thickness 43 of the second spring element body part 12, as illustrated in FIG. 9.

The embodiments illustrated as examples represent possible variants of the spring element 4 or friction device, in particular the clutch disk 1, and it should be pointed out at this stage that various combinations of the individual embodiments with one another are also possible.

For the sake of good order, finally, it should be pointed out that, in order to provide a clearer understanding of the structure of the spring element 4 or friction device, in particular the clutch disk 1, it and its constituent parts are illustrated to a certain extent out of scale and/or on an enlarged scale and/or on a reduced scale.

The first receiving tabs 19 and the second receiving tabs 20 of a receiving area 15 are disposed respectively one behind the other in the axial direction and partially spaced apart from one another.

LIST OF REFERENCE NUMBERS

| | |
|---|---|
| 1 | Clutch disk |
| 2 | Friction lining |
| 3 | Friction lining |
| 4 | Spring element |
| 5 | Main body |
| 6 | Torsion spring |
| 7 | Orifice |
| 8 | Support element |
| 9 | Circumference |
| 10 | Spring element body |
| 11 | Spring element body part |
| 12 | Spring element body part |
| 13 | Spring element circumference |
| 14 | Circumferential direction |
| 15 | Receiving area |
| 16 | Friction group |
| 17 | Friction group |
| 18 | Rivet |
| 19 | Receiving tab |
| 20 | Receiving tab |
| 21 | Rivet |
| 22 | Base |
| 23 | Tab part |
| 24 | Tab part |
| 25 | Base |
| 26 | Tab part |
| 27 | Tab part |
| 28 | Bore |
| 29 | Bore |
| 30 | Rivet |
| 31 | Rivet |
| 32 | Indentation |
| 33 | Indentation |
| 34 | Friction lining support |
| 35 | Friction lining support |
| 36 | Cut-out |
| 37 | Tab height |
| 38 | Tab distance |
| 39 | Tab distance |
| 40 | Tab width |
| 41 | Tab width |
| 42 | Wall thickness |
| 43 | Wall thickness |

The invention claimed is:

1. A spring element for a friction device the spring element comprising:
    a spring element body having a first spring element body part and a second spring element body part disposed one behind the other in an axial direction and in contact with one another in some regions,
    wherein the first spring element body part has first receiving areas for receiving first friction linings such that the first friction linings are disposed adjacent to one another in a circumferential direction on a first outwardly-facing side of the spring element body and secured thereto,
    wherein the second spring element body part has second receiving areas for receiving second friction linings such that the second friction linings are disposed adjacent to one another in a circumferential direction on a second outwardly-facing side of the spring element body, opposite the first outwardly-facing side, and secured thereto,
    wherein the first spring element body part and the second spring element body part are of an annular shape,
    wherein each first receiving area for the first friction linings comprises a first receiving area first receiving tab and a first receiving area second receiving tab, wherein the first receiving area first receiving tab is disposed underneath the first receiving area second receiving tab in a radial direction,
    wherein each second receiving area for the second friction linings comprises a second receiving area first receiving tab and a second receiving area second receiving tab, wherein the second receiving area first receiving tab is disposed underneath the second receiving area second receiving tab in the radial direction,
    wherein the first receiving area first receiving tabs and the second receiving area first receiving tabs are disposed in pairs one behind another in the axial direction and the first receiving area second receiving tabs and the second receiving area second receiving tabs are disposed in pairs one behind another in the axial direction, and
    wherein a maximum distance between the first receiving area first receiving tabs and the second receiving area first receiving tabs for at least one pair of the first receiving area first receiving tabs and the second receiving area first receiving tabs is shorter or longer than a maximum distance between the first receiving area second receiving tabs and the second receiving area second receiving tabs in the axial direction.

2. The spring element according to claim 1, wherein the first receiving area first receiving tabs are disposed respectively at least partially in a cut-out of the first spring element body part and/or the second receiving area first receiving tabs are disposed respectively at least partially in a cut-out of the second spring element body part.

3. The spring element according to claim 1, wherein at least one of the first receiving area first receiving tabs is shorter in the radial direction than the first receiving area second receiving tabs in the radial direction and/or at least one of the first receiving area second receiving tabs is shorter in the radial direction than the first receiving area first receiving tabs in the radial direction and/or wherein at least one of the second receiving area first receiving tabs is shorter in the radial direction than the second receiving area second receiving tabs in the radial direction and/or at least one of the second receiving area second receiving tabs is shorter in the radial direction than the second receiving area first receiving tabs in the radial direction.

4. The spring element according to claim 1, wherein at least one of the first receiving area first receiving tabs is shorter in the radial direction than a respective first receiving area second receiving tab and/or at least one of the second receiving area first receiving tabs is shorter in the radial direction than a respective second receiving area second receiving tab.

5. The spring element according to claim 1, wherein at least one of the first receiving area first receiving tabs, the first receiving area second receiving tabs, the second receiving area first receiving tabs and the second receiving area second receiving tabs has a shorter maximum tab width in a circumferential direction of the spring element body than the rest of the first receiving area first receiving tabs, the first receiving area second receiving tabs, the second receiving area first receiving tabs and the second receiving area second receiving tabs.

6. The spring element according to claim 1, wherein the each of the first spring element body part and the second spring element body part is a single piece.

7. A friction device, comprising a disk-shaped main body with a support element, the support element having an external circumference around which several friction groups are distributed, and the friction groups respectively comprise a first friction lining and a second friction lining disposed behind the first friction lining in the axial direction, wherein the first and second friction linings are connected to a spring element according to claim 1, directly or with a friction lining support disposed respectively in between, and the spring element is connected to the support element, and the spring element is disposed between the first and the second friction linings.

8. The spring element according to claim 1, wherein the first receiving area first receiving tab and the first receiving area second receiving tab of each and every first receiving area for the first friction linings are formed by the first spring element body part and the second receiving area first receiving tab and the second receiving area second receiving tab of each and every second receiving area for the second friction linings are formed by the second spring element body part.

9. A spring element for a friction device, the spring element comprising:
    a spring element body having a first spring element body part and a second spring element body part disposed one behind the other in an axial direction and in contact with one another in some regions,
    wherein the first spring element body part has first receiving areas for receiving first friction linings such that the first friction linings are disposed adjacent to one another in a circumferential direction on a first outwardly-facing side of the spring element body and secured thereto,
    wherein the second spring element body part has second receiving areas for receiving second friction linings such that the second friction linings are disposed adjacent to one another in a circumferential direction on a second outwardly-facing side of the spring element body, opposite the first outwardly-facing side, and secured thereto,
    wherein the first spring element body part and the second spring element body part are of an annular shape,
    wherein each first receiving area for the first friction linings comprises a first receiving area first receiving tab and a first receiving area second receiving tab, wherein the first receiving area first receiving tab is disposed underneath the first receiving area second receiving tab in a radial direction, wherein each second receiving area for the second friction linings comprises a second receiving area first receiving tab and a second receiving area second receiving tab, wherein the second receiving area first receiving tab is disposed underneath the second receiving area second receiving tab in the radial direction, wherein the first receiving area first receiving tabs and the second receiving area first receiving tabs are disposed in pairs one behind another in the axial direction and the first receiving area second receiving tabs and the second receiving area second receiving tabs are disposed in pairs one behind another in the axial direction, and wherein a maximum distance between the first receiving area first receiving tab and the second receiving area first receiving tab of at least one pair of the first receiving area first receiving tabs and second receiving area first receiving tabs disposed one behind the other in the axial direction is longer than a maximum distance between the first receiving area first receiving tab and the second receiving area first receiving tab of a pair of first receiving area first receiving tabs and second receiving area first receiving tabs disposed adjacent to the at least one pair in the circumferential direction of the spring element body and/or a maximum distance between the first receiving area second receiving tab and the second receiving area second receiving tab of at least one pair of the first receiving area second receiving tabs and second receiving area second receiving tabs disposed one behind the other in the axial direction is longer than a maximum distance between the first receiving area second receiving tab and the second receiving area second receiving tab of a pair of first receiving area second receiving tabs and second receiving area second receiving tabs disposed adjacent to the at least one pair in the circumferential direction of the spring element body.

10. A spring element for a friction device, the spring element comprising:

a spring element body having a first spring element body part and a second spring element body part disposed one behind the other in an axial direction and in contact with one another in some regions, wherein the first spring element body part has first receiving areas for receiving first friction linings such that the first friction linings are disposed adjacent to one another in a circumferential direction on a first outwardly-facing side of the spring element body and secured thereto, wherein the second spring element body part has second receiving areas for receiving second friction linings such that the second friction linings are disposed adjacent to one another in a circumferential direction on a second outwardly-facing side of the spring element body, opposite the first outwardly-facing side, and secured thereto, wherein the first spring element body part and the second spring element body part are of an annular shape, wherein each first receiving area for the first friction linings comprises a first receiving area first receiving tab and a first receiving area second receiving tab, wherein the first receiving area first receiving tab is disposed underneath the first receiving area second receiving tab in a radial direction, wherein each second receiving area for the second friction linings comprises a second receiving area first receiving tab and a second receiving area second receiving tab, wherein the second receiving area first receiving tab is disposed underneath the second receiving area second receiving tab in the radial direction, wherein the first receiving area first receiving tabs and the second receiving area first receiving tabs are disposed in pairs one behind another in the axial direction and the first receiving area second receiving tabs and the second receiving area second receiving tabs are disposed in pairs one behind another in the axial direction, and wherein the first spring element body part has a first wall thickness, at least in a region of the first receiving area first receiving tabs and the first receiving area second receiving tabs, and the second spring element body part has a second wall thickness, at least in a region of the second receiving area first receiving tabs and the second receiving area second receiving tabs, and the first wall thickness is slimmer than the second wall thickness.

* * * * *